United States Patent [19]

Suzuki et al.

[11] Patent Number: 4,930,206

[45] Date of Patent: Jun. 5, 1990

[54] APPARATUS AND METHOD FOR FIXING AND POSITIONING A NUT PLATE

[75] Inventors: Takashi Suzuki; Yukio Kimura, both of Tokyo, Japan

[73] Assignee: Fuji Jukogyo Kabushiki Kaisha, Tokyo, Japan

[21] Appl. No.: 356,113

[22] Filed: May 24, 1989

[30] Foreign Application Priority Data

May 26, 1988 [JP] Japan .................. 63-128781

[51] Int. Cl.⁵ .................. B21D 39/00; B23R 11/00
[52] U.S. Cl. .................. 29/525.2; 29/243.54
[58] Field of Search ............ 29/243.54, 243.53, 522.1, 29/526.2, 509, 524.1, 525.1, 525.2; 227/61, 62, 152, 153, 99; 72/391, 354, 311, 453.17; 173/128, 131, 133; 411/501, 500, 504

[56] References Cited

U.S. PATENT DOCUMENTS

| | | |
|---|---|---|
| 3,887,984 | 6/1975 | Erlichman .................. 29/243.53 |
| 4,223,433 | 9/1980 | Rosman .................. 29/243.54 |
| 4,637,114 | 1/1987 | Mathews .................. 29/243.54 |

*Primary Examiner*—Robert C. Watson
*Attorney, Agent, or Firm*—Beveridge, DeGrandi & Weilacher

[57] ABSTRACT

A nut plate is provided with holes and inserted into a space between a reference plate and a support plate. A nut plate bracing member is provided with a pin and located below the support plate, and when the support plate is retracted, the nut plate falls so that the hole of the nut plate is engaged with the pin of the nut plate bracing member. The nut plate bracing member with the nut plate mounted is transferred to the portion directly below the plate to which the nut plate is fixed. The nut plate bracing member is raised to position the nut plate to a fixing portion of the plate. The nut plate holding pin is then raised into the nut hole of the nut plate. The rivet is then driven into the hole of the nut plate and the rivet is clamped by means of the punch.

9 Claims, 5 Drawing Sheets

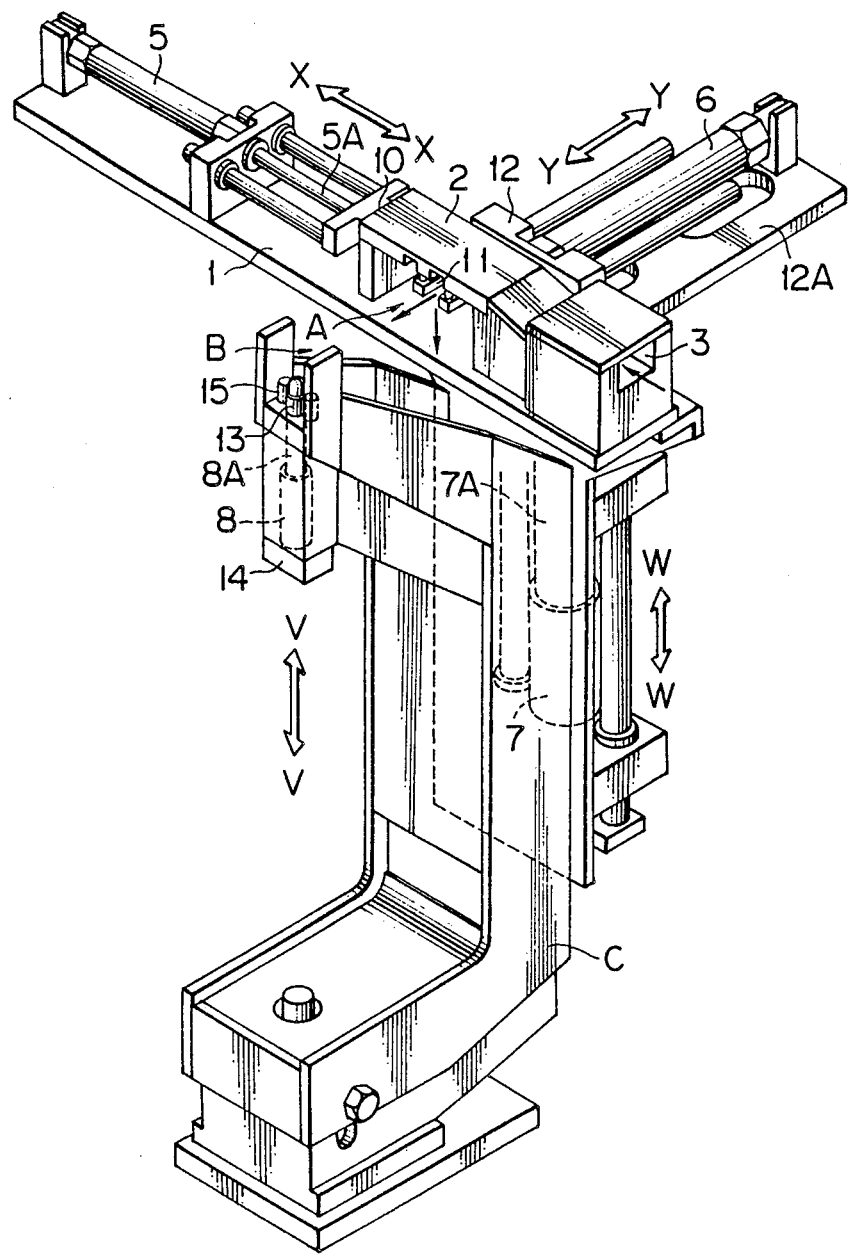
F I G. 1

APPARATUS AND METHOD FOR FIXING AND POSITIONING A NUT PLATE

BACKGROUND OF THE INVENTION

The present invention relates to an apparatus and method for positioning a nut plate to be fixed to an adjoining plate, particularly, wherein the nut plate is automatically supplied and positioned at the predetermined position and a rivet is also automatically supplied and driven thereon.

Generally, a plate on which a nut is mounted (called hereinafter merely "a nut plate") is fixed to a rear side of an plate (skin) of an aircraft, for example, for facilitating bolt fastening work. The nut plates of this kind usually comprise a plate body and a nut mounted on the plate body to be movable only in one direction. The nut plate is attached by rivets at predetermined positions on both sides of the plate body. In this work, it is required for an operator to position the driving position of the rivet exactly. This positioning work is hard and a slight shift of the riveting position makes it difficult to exactly perform the bolt fastening working after the riveting operation.

In order to solve such problem, in the prior art, for example, there is provided Japanese Utility Model Publication No. 59-14026 (14026/1984) disclosing a handheld riveting device provided with a punch to be fitted in the hole of the plate body and a pilot bar to be fixed into a nut fastening hole.

However, the riveting device of the type described above solves only the problem of the positioning of the nut plate to be riveted, but the riveting device is of the hand-held type, so that the positioning and riveting work requires that the operator spend much time and labor.

SUMMARY OF THE INVENTION

An object of the present invention is to eliminate the defects or drawbacks encountered in the prior art described above and to provide an apparatus and method for positioning a nut plate to be joined with an adjoining plate, and which is also capable of automatically supplying and positioning of the nut plate and supplying and driving a rivet in a short working time.

This and other objects can be achieved, in one aspect, according to the present invention by providing an apparatus for positioning a nut plate provided with a nut having a nut hole and with a hole through which a rivet is driven to fix the nut plate to a plate, the apparatus comprising: a reference plate member; a support plate disposed below the reference plate member with a space therebetween; a device for supplying a nut plate into the space; a nut plate bracing member disposed directly below the nut plate supplied in the space and provided with a pin to be fitted into the hole of the nut plate; a transfer device for transferring the nut plate bracing member so that the nut plate is transferred to a portion directly below the plate to which the nut plate is fixed; an elevating device for elevating the nut plate bracing member to position the nut plate at the position to which the plate is to be fixed; a nut plate holding number disposed to be elevatable at the position to be inserted into the nut hole to support the nut plate to the plate; and a device for riveting the rivet into the hole of the nut plate and fastening the nut plate to the plate.

In other aspect of the present invention, the objects described above can be achieved by providing a method for positioning a nut plate with a nut hole and a rivet hole. The nut plate positioning method comprises the steps of; inserting a support plate into a space below a reference plate; locating the nut plate bracing member below the nut plate so that a pin provided on an outer surface of the nut plate bracing member is positioned directly below the hole of the nut plate; moving the support plate backwards so as to lower the nut plate so that the hole of the nut plate is engaged with the nut plate holding member of the nut plate bracing member; transferring the nut plate bracing member together with the nut plate to a position directly below an plate to which the nut plate is fixed; raising the nut plate bracing member at a portion of which the nut plate is fixed to the plate; raising said nut plate holding pin so that the holding pin is inserted into the nut hole to support the nut plate to the plate; and driving a rivet into the hole of the nut plate to fasten the nut plate to the plate.

According to the embodiments of the present invention, the nut plate is inserted into the space between the reference plate and the support plate, and supported by the support plate. The nut plate bracing member is provided with a pin and located below the support plate, and when the support plate is retracted, the nut plate falls so that the hole of the nut plate is engaged with the pin of the nut plate bracing member. The nut plate bracing member with the nut plate is transferred to the portion directly below the plate to which the nut plate is fixed. The nut plate bracing member is raised to set the nut plate to a fixing portion of the plate. The nut plate support pin is then raised into the nut hole of the nut plate. The rivet is then driven into the hole of the nut plate and the rivet is clamped by means of the punch.

Accordingly, the supplied nut plate is supported at the predetermined position and then transferred to the position directly below the plate to which the nut plate is fixed together with the nut plate bracing member. The nut plate is positioned at a portion to be fixed and the rivet is driven to fasten the nut plate to the plate, whereby the entire steps are automated and the operator working time and labor can be reduced.

The preferred embodiments and the other objects and features of the present invention will become understood from the following description with reference to the accompanying drawings.

BRIEF DESCRIPTION OF THE DRAWINGS

FIG. 1 is a perspective view of a nut plate fixing apparatus according to the present invention

FIG. 14a is a plan view of a nut plate according to the present invention; and

FIG. 14b is a sectional view of the nut plate shown in FIG. 14a.

DESCRIPTION OF THE PREFERRED EMBODIMENTS

Figure 2:
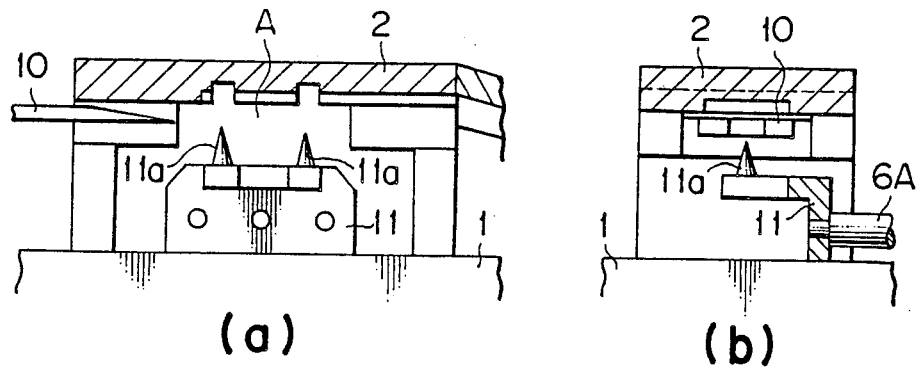
FIGS. 2a, 2b, 3a, 3b, 4a, 4b, 5a, 5b, 6a, 6b, and 7 to 13 are front and side views for explaining sequential steps of a nut plate fixing method.

In advance of detailed description of preferred embodiment according to the present invention, a conventional general technique of this field will be first described hereunder with reference to the nut plate shown in FIGS. 14a and 14b for a better understanding of the present invention.

FIG. 14a and FIG. 14b show a nut plate 4 to be fixed to a rear side surface of plate of an aircraft, for example, for facilitating the bolt fastening work. The nut plate 4 of this kind comprises, usually, a plate body 4a and a nut 4b mounted on the plate body 4a to be movable only in one direction. The nut plate 4 is attached to the rear surface of the plate of the aircraft by driving rivets in two rivet holes 4c formed at the redetermined positions of both sides of the plate body 4a. This operation requires an exact positioning the rivets to drive. This positioning operation is hard and a slight shift of the riveting position makes it difficult for bolt fastening work precisely after the riveting operation.

In order to solve such a problem, in the prior art there is provided a hand-held riveting device provided with a punch to be fitted in the rivet holes 4c of the plate body, and a pilot bar to be fitted into a nut fastening hole 4d for exact positioning and riveting work.

The riveting device of the type described above solves the problem of the positioning of the nut plate in the riveting work, but the riveting device is of the hand-held type, so that the positioning and riveting work requires that the operator spend much time and labor.

These problems can be substantially eliminated by a nut plate fixing apparatus according to the present invention, which is shown in FIG. 1.

Figure 14:
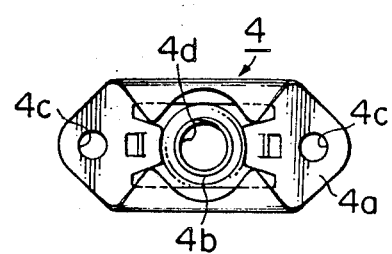
Figure 14:
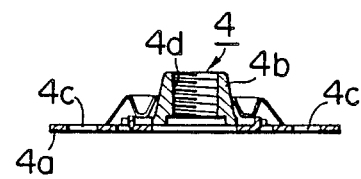

Referring to FIG. 1, the nut plate fixing apparatus includes a reference base 1 mounted on the top of a frame C of the fixing apparatus and having a flat upper surface to which a planar-type reference plate member 2 is mounted. A nut plate 4, not shown in FIG. 1 but shown in FIG. 14, is automatically supplied to an inner portion of the planar-type reference plate member 2 through a supply port 3. The inner portion of the reference plate member 2 is referred to as a first station a shown in FIG. 1.

The nut plate fixing apparatus shown in FIG. 1 further includes cylinder assemblies 5, 6, 7 and 8, which are respectively referred to hereunder as an X-axis cylinder assembly 5, a Y-axis cylinder assembly 6, W-axis cylinder assembly 7, and a V-axis cylinder assembly 8. The X-axis cylinder assembly 5 is disposed on the upper surface of the reference base 1 and provided with a piston rod 5A having an end to which a support plate 10 is attached horizontally movable in an arrowed direction X—X in the first station A. The Y-axis cylinder assembly 6 is mounted to the apparatus and provided with a piston rod 6A having an operational end to which a nut plate bracing member 11 is attached to be horizontally movable in an arrowed direction Y—Y in the first station A. The W-axis cylinder assembly 7 is also provided with a piston rod 7A having an operational end to which a fixing plate 12 is attached so that the Y-axis cylinder assembly 6, a bottom plate 12 A and the nut plate bracing member 11 are both elevated in accordance with the elevating motion of the fixing plate 12. The W-axis cylinder assembly 7 is movable in a vertically arrowed direction W—W. The V-axis cylinder assembly 8 includes a piston rod 8A having an end to which a nut plate holding pin 13 is attached. The pin 13 is elevatable. The V-axis cylinder assembly 8 is secured to a lower anvil 14 to which a lower punch 15 is fixed so that the anvil 14 and the punch 15 are elevatable in an arrowed direction V—V together with a lower cylinder assembly, not shown.

The fixing of the nut plate 4 to the plate will be carried out with the steps of the fixing method of the present invention described hereunder with reference to FIGS. 2 to 13.

Figure 3:
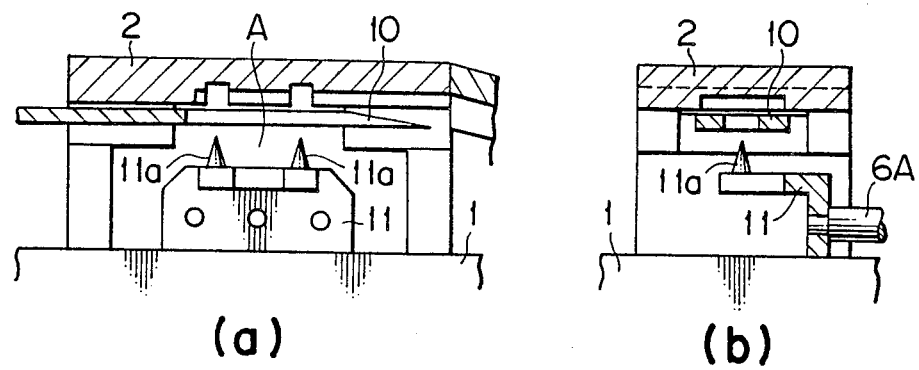
Figure 4:
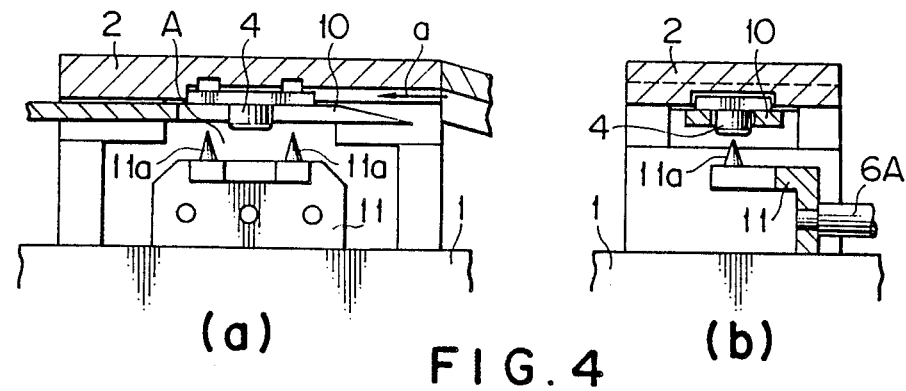
Figure 5:
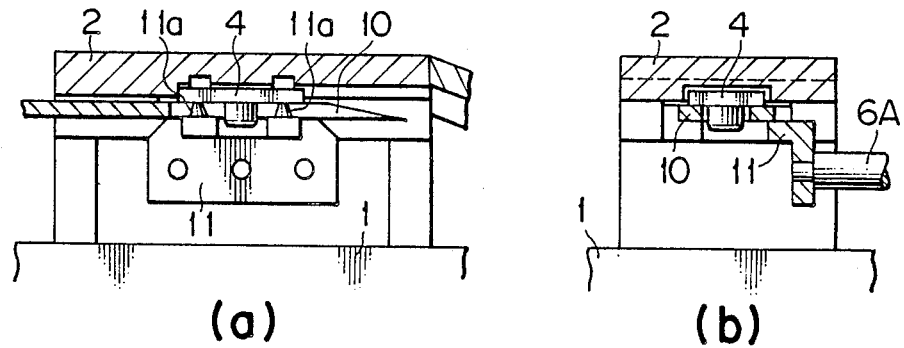

Referring to FIGS. 2 and 3, the X-axis cylinder assembly 5 is actuated to forwardly displace the piston rod 5A and also to forwardly move the support plate 10 into the first station A. FIGS. 2a and 3a are front views and FIGS. 2b and 3b are side viewed thereof. At the next step as represented by FIG. 4, the nut plate 4 is supplied into the first station A through the supply port 3, shown in FIG. 1, from an arrowed direction a to mount the nut plate 4 on the support plate 10.

Figure 6:
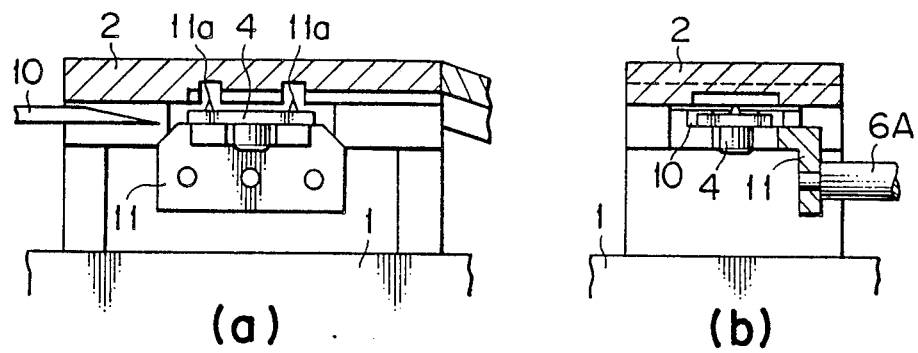

The W-axis cylindrical assembly 7 is then actuated to upwardly move the nut plate bracing member 11 so that the front ends of pins 11a and 11a mounted on the nut plate bracing member 11 are fitted into the rivet holes 4c (FIG. 14) into which rivets are to be driven as represented in FIGS. 5a and 5b. At the next step, as shown in FIG. 6, the X-axis cylinder assembly 5 is actuated to move the support plate 10 backwards from the first station A. In the disengagement of the nut plate 4 and the support plate 10, the nut plate 4 falls by its own weight, whereby the rivet holes 4c of the nut plate 4 are securely engaged with the pins 11a of the nut plate bracing member 11.

Figure 7:
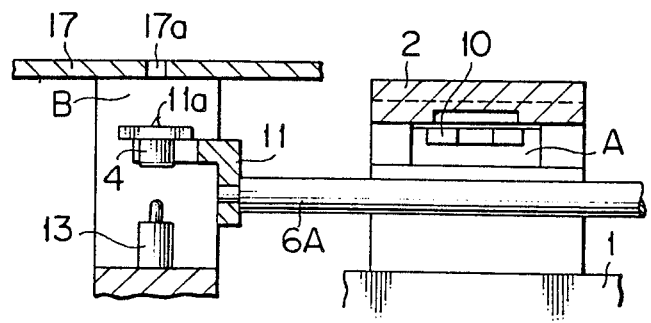
Figure 8:
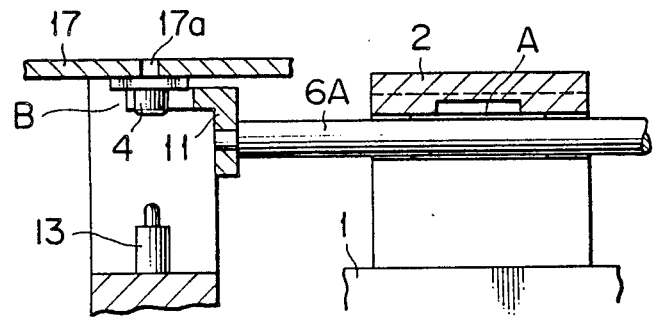

Referring to FIG. 7, the Y-axis cylinder assembly 6 is actuated to forwardly move the piston rod 6A to transfer the nut plate 4 on the nut plate bracing member 11 to the second station B above which plate 17 is disposed. At the next step, as shown in FIG. 8, the W-axis cylinder assembly 7 is actuated to raise the nut plate bracing member 11 to set the nut plate 4 on the nut plate bracing member 11 to a predetermined fixing position 17a of the plate 17.

Figure 9:
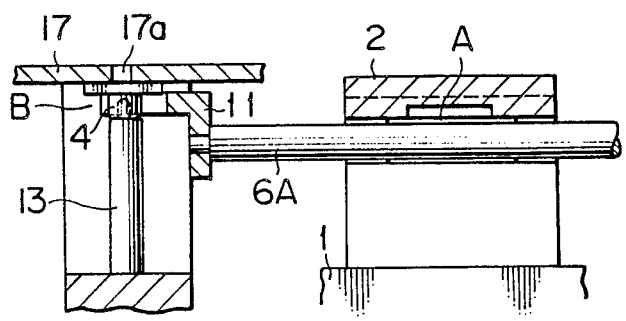
Figure 10:
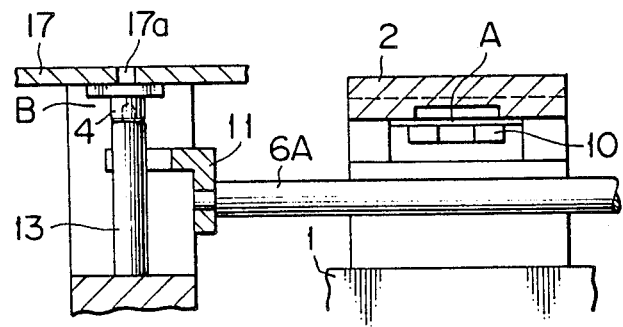
Figure 11:
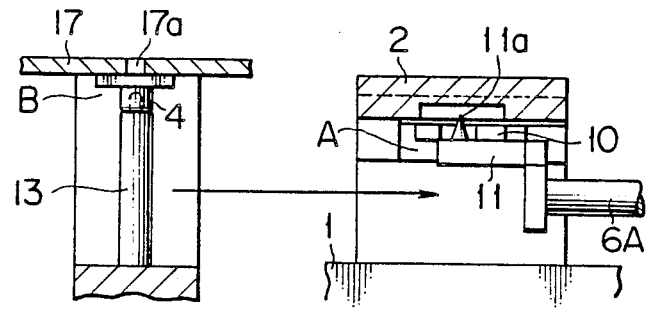

The V-axis cylinder assembly 8 is then actuated as shown in FIG. 9 to raise the nut plate holding pin 13 so that the front end of the pin 13 is fitted into the nut hole 4d of the nut plate 4. The W-axis cylinder assembly 7 is actuated as shown in FIG. 10 to retract the piston rod 7A to lower the nut plate bracing member 11 and then to retract the same into the first station A as shown in FIG. 11.

Figure 12:
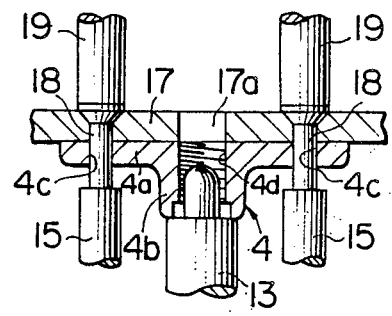
Figure 13:
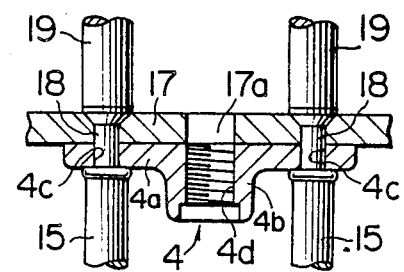

Referring to FIG. 12, in the second station B, two rivets 18 are simultaneously supplied from upper portions of the plate 17 through the rivet supplying device, not shown. The upper end of each rivet 18 is then pressed by a rivet clamping punch 19 and the lower end thereof is also pressed by a lower punch 15. At the next step, as shown in FIG. 13, the nut plate holding pin 13 is lowered and the lower punch 15 is raised by actuating the lower cylinder assembly, not shown, to firmly fasten the rivets 18.

As described above, according to the nut plate fixing apparatus and the method of the present invention, all the work inclusive of nut plate supplying and positioning steps, and rivet supplying and riveting steps are automatically and effectively carried out.

While the presently preferred embodiment of the present invention has been shown and described, it is to be understood that this disclosure is for the purpose of illustration and that various changes and modifications may be made without departing from the scope of the invention as set forth in the appended claims.

What is claimed is

1. An apparatus for positioning a nut plate provided with a nut having a nut hole and with a hole through which a rivet is driven to fix the nut plate to a plate, comprising:

a reference plate;

a support plate disposed below said reference plate with a space therebetween;

moving means for moving said support plate with respect to said reference plate;

feeding means for supplying the nut plate into the space;

a nut plate bracing member disposed directly below said nut plate supplied in the space and provided with a pin to be fitted into the hole of said nut plate;

transfer means for transferring said nut plate bracing member so that said nut plate is transferred to a position directly below the plate to which the nut plate is to be fixed;

elevating means for elevating said nut plate bracing member to position the nut plate to a fixing position of said plate; and a nut plate holding member disposed to be elevatable so as to support said nut plate adjacent to said plate.

2. The apparatus according to claim 1, wherein said transfer means for transferring said nut plate bracing member comprises:

a cylinder assembly provided with a piston rod having one end to which said nut plate bracing member is attached.

3. The apparatus according to claim 1, wherein said elevating means for elevating said nut plate bracing member comprises:

a cylinder assembly provided with a piston rod having one end to which said nut plate bracing member is connected.

4. The apparatus according to claim 1, further comprising means for riveting a rivet into the hole of said nut plate and fastening said nut plate adjacent to said plate.

5. The apparatus according to claim 4, wherein said riveting means for riveting and fastening the rivet comprises:

a rivet clamping punch supporting the rivet driven in said plate and said nut plate at the upper portion thereof and a lower punch supporting said rivet at the lower portion thereof.

6. The apparatus according to claim 1, wherein said nut plate holding member comprises:

an extension adapted to be inserted into said nut hole to support said nut plate adjacent to said plate.

7. A method for positioning a nut plate provided with a nut having a nut hole and with a hole through which a rivet is driven to fix the nut plate to an adjoining plate comprising a reference plate, a support plate disposed below said reference plate with a space therebetween, a nut plate bracing member disposed directly below said nut plate supplied in the space and provided with a pin to be fitted into the hole of said nut plate, a nut plate bracing member transferring device, a nut plate bracing member elevating device, and a nut plate holding member disposed to be elevatable so as to support said nut plate adjacent to said plate, said nut plate positioning method comprising the steps of:

inserting said support plate into the space below said reference plate;

locating said nut plate bracing member below said nut plate so that said pin is positioned directly below the hole of said nut plate;

backwardly moving said support plate so as to lower said nut plate so that the hole of said nut plate is engaged with said pin of the nut plate bracing member;

transferring sad nut plate bracing member with said nut plate to a position at which said nut plate is adjacent to said plate; and raising said nut plate holding member so that the nut plate holding member supports said nut plate in the position adjacent to said plate.

8. The method according to claim 5, further comprising the step of:

driving a rivet into the hole of said nut plate to fasten said nut plate to said plate.

9. A method for positioning a nut plate provided with a nut having a nut hole and with a hole through which a rivet is driven to fix the nut plate to an adjoining plate, comprising the steps of:

providing a reference plate in a fixed position;

inserting a support plate in position below said reference plate so as to provide a nut plate support space;

feeding a nut plate between said reference plate and support plate and into the nut plate support space;

manipulating a nut plate bracing member and said nut plate such that a pin forming a part of said nut bracing member is positioned within the hole of said nut plate;

withdrawing said support plate from the nut plate support space;

transferring said nut plate bracing member and said pin positioned nut plate to a position at which said nut plate is adjacent a plate to which said nut plate is to be fixed;

raising a nut plate holding member such that the nut plate holding member supports said nut plate in the position adjacent to said plate; and retracting said nut plate bracing member so as to remove said pin from the position within the hole of the nut plate.

* * * * *